J. F. RUDE.
CHAIN GEARING.
APPLICATION FILED SEPT. 26, 1914.
1,209,210.
Patented Dec. 19, 1916.
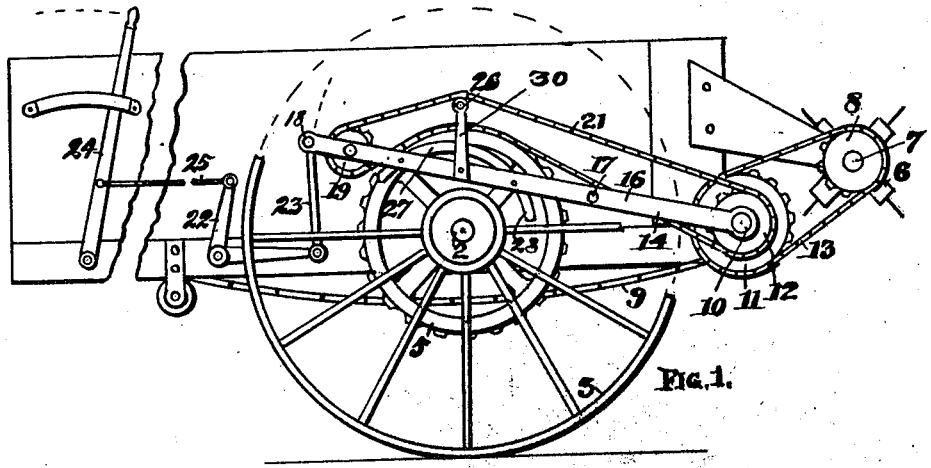
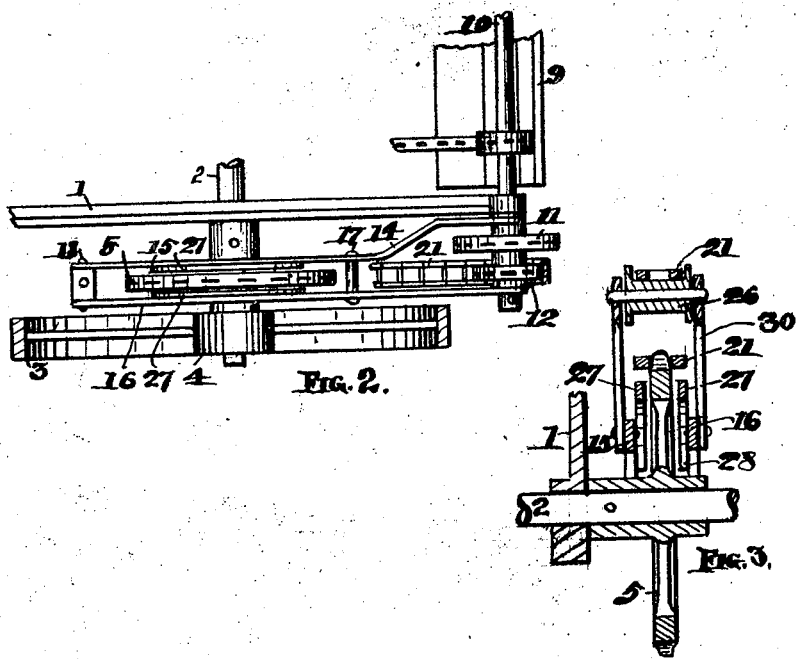
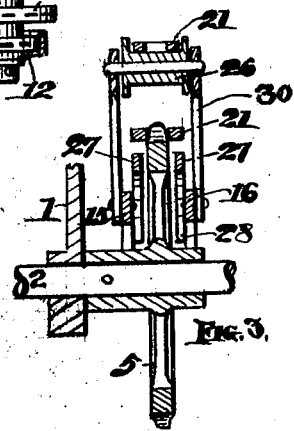
Witnesses.
John F. Rude, Inventor,
By Robert S. Carr,
Attorney.

UNITED STATES PATENT OFFICE.

JOHN F. RUDE, OF LIBERTY, INDIANA.

CHAIN GEARING.

1,209,210.   Specification of Letters Patent.   Patented Dec. 19, 1916.

Application filed September 26, 1914. Serial No. 863,688.

*To all whom it may concern:*

Be it known that I, JOHN F. RUDE, a citizen of the United States, residing at Liberty, Indiana, have invented a new and useful Improvement in Chain Gearing, of which the following is a specification.

My invention relates to chain gearing of the class adapted to the use of manure spreaders or for other suitable purposes, and the objects of my improvements are to provide driven chain connections from the axle with the beater having an intermediate differential idler mounted on the intermittently rotative apron shaft; to provide mechanism swiveled at a fixed point for detachably engaging the driving chain with the driving wheel; to provide means for moving both stretches of the driving chain in the same vertical plane simultaneously; to provide positive means for disengaging the links of the driving chain from the driving wheel in successive order; to provide means for supporting the slack in the chain when in disengaged position, and to provide simple and durable construction and assemblage of the various members for securing facility of operation and efficiency of action. These objects may be attained in the following described manner as illustrated in the accompanying drawings, in which:

Figure 1 is a side elevation with parts broken away of a manure spreader provided with my improvements; Fig. 2 a plan, and Fig. 3 a vertical transverse section in the plane of the axle.

In the drawings 1 represents the body, 2 the rear axle, 3 a ground wheel, 4 the usual pawl and ratchet connection of the axle therewith, 5 a driving sprocket wheel secured on the axle, 6 the beater, 7 the beater shaft provided with the sprocket wheel 8, 9 the apron or conveyer, 10 the apron driving shaft actuated intermittently from the beater shaft by means of a pawl and ratchet wheel having eccentric rod connections therewith (not shown), all being constructed and arranged in the ordinary manner.

Two sprocket wheels 11 and 12 of different size either integral or secured together to turn in unison are mounted to turn on the extended end of the apron shaft. The larger one of said wheels 11 is connected by means of the chain 13 with the sprocket wheel 8 on the beater shaft. An arm 14 formed of parallel bars 15 and 16 connected together at an intermediate point and also near their front ends by means of bolts 17 and 18 is swiveled on the apron shaft and spans the sprocket wheels 11 and 12 thereon. An idle sprocket wheel 19 carried by said arm near its front end engages with the driving chain 21 which is extended from the idle sprocket wheel 12. A bell crank lever 22 which connects at one end with the bolt 18 by means of the link 23 and at the other end with the hand lever 24 by means of the rod 25 serves to swing the arm in a vertical plane for detachably engaging the driving chain 21 with the sprocket wheel 5. A guide wheel 26 for the upper stretch of the driving chain 21 is supported above the arm 14 on the brackets 30 secured thereto, and the bolt 17 serves to support the slack or sag in the lower stretch of said chain when it is disengaged from the driving wheel.

Curved lifting bars 27 are secured on the members of the arm 14 eccentric to the driving wheel 5, and adjacent to its opposite ends for successively disengaging the links of the chain therefrom during the raising of the arm, less danger of breakage and less exertion being required to disengage the links gradually and successively in this manner than suddenly and simultaneously or even successively in opposite directions from an intermediate point of their engagement. The width of the driving chain exceeds that of the driving wheel and its edges extend over the bars as shown in Fig. 3. The downwardly extended rear ends 28 of said lifting bars being adjacent to the opposite ends of the driving wheel prevent lateral movement of the arm when in an elevated position with the driving chain out of engagement with the wheel 5.

In operation, the hand lever with its connections serves to depress the arm with the chain into engagement with the driving sprocket wheel as shown in Fig. 1, or to elevate the arm with the chain out of engagement therewith. In elevating the arm the lifting bars successively disengage the links on the lower stretch of the driving chain from the driving wheel in a rearward direction and engage them in reverse order therewith when the arm is lowered. The intermediate differential sprocket wheel on the apron shaft serves to transmit increased speed to the beater from the driving wheel. Applicant's construction avoids the use of clutches which are liable to wear out of adjustment and also the use of spur or other gears from which the teeth are frequently stripped under the heavy duty required of them.

Having fully described my improvement, what I claim as my invention and desire to secure by Letters Patent of the United States is:

1. In a chain gearing the combination of, driving and driven wheels, an arm movable in the plane thereof, an idle wheel on the arm, a chain connecting the driven wheel therewith, a curved bar on the arm eccentric with the driving wheel, and means for moving the arm with the bar for ungearing the chain from the driving wheel.

2. A chain gearing comprising driving and driven wheels, an arm swiveled at a fixed point, an idle wheel and curved chain supporting bars on said arm, a chain connecting the idle with the driven wheel, and means for moving the arm with the bars for successively disengaging the links and maintaining the chain out of engagement with the driving wheel.

3. A chain gearing comprising driving and driven wheels, an arm movable in the plane of the driving wheel, an idle wheel on said arm, chain connections from said idle wheel to the driven wheel, curved bars secured to the arm eccentric to the driving wheel, and lever connections for actuating the arm with the bars, for gradually moving and maintaining the chain out of engagement with the driving wheel.

4. A chain gearing comprising a driving wheel, a chain movable with one of its stretches into engagement therewith, a curved lifting bar eccentric with the wheel and lever mechanism arranged to move and maintain said bar with the chain out of engagement with the wheel.

5. A chain gearing comprising a driving wheel, an arm swiveled at a fixed point, an idle wheel carried by said arm, a driving chain engaging therewith and movable into detachable engagement with the driving wheel, and a curved lifting bar secured on the arm eccentric to the driving wheel and movable therewith for successively disengaging the links of the chain from the said wheel.

6. A chain gearing comprising a driving wheel, an endless chain supported with one of its stretches in engagement therewith, curved lifting bars eccentric with the wheel and hand actuated mechanism arranged to move said bars with the chain for disengaging its links successively from, and in a direction opposite to, the movement of the wheel.

JOHN F. RUDE.

Witnesses:
JAMES H. DAVIS,
R. S. CARR.